(12) United States Patent
Lee et al.

(10) Patent No.: US 11,449,184 B2
(45) Date of Patent: Sep. 20, 2022

(54) TOUCH SENSOR, WINDOW STACK STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Cheol Hun Lee, Gyeonggi-do (KR); Jin Bok Yang, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/386,511

(22) Filed: Jul. 27, 2021

(65) Prior Publication Data

US 2021/0357080 A1 Nov. 18, 2021

Related U.S. Application Data

(63) Continuation of application No. PCT/KR2020/001124, filed on Jan. 22, 2020.

(30) Foreign Application Priority Data

Jan. 28, 2019 (KR) ........................ 10-2019-0010552

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC ................. G06F 3/0446; G06F 3/0412; G06F 2203/04111
See application file for complete search history.

(56) References Cited

U.S. PATENT DOCUMENTS

2009/0085891 A1 4/2009 Yang et al.
2013/0106747 A1* 5/2013 Choi ..................... G06F 3/0446
345/173

(Continued)

FOREIGN PATENT DOCUMENTS

JP 2010-086498 A 4/2010
KR 10-2013-0046263 A 5/2013

(Continued)

OTHER PUBLICATIONS

International Search Report for PCT/KR2020/001124 dated May 8, 2020.

*Primary Examiner* — Peter D McLoone
(74) *Attorney, Agent, or Firm* — The PL Law Group, PLLC (57) ABSTRACT

A touch sensor according to an embodiment of the present invention includes a substrate layer having an active region and a peripheral region, a plurality of sensing channel columns and a plurality of sensing channel rows disposed on the active region of the substrate layer and extending in directions crossing each other, channel column traces branching from the sensing channel columns and extending on the peripheral region, channel row traces branching from the sensing channel rows and extending on the peripheral region, and a trace connector coupling the channel column traces branching from the same sensing channel columns.

18 Claims, 4 Drawing Sheets

(56) References Cited

U.S. PATENT DOCUMENTS

| | | | |
|---|---|---|---|
| 2014/0028599 A1* | 1/2014 | Jeong | G06F 3/0446 345/173 |
| 2015/0042903 A1* | 2/2015 | Misaki | G06F 3/04164 349/12 |
| 2016/0139728 A1* | 5/2016 | Jeon | G06F 3/0448 345/173 |
| 2020/0110499 A1* | 4/2020 | Lee | G06F 3/044 |

FOREIGN PATENT DOCUMENTS

| | | |
|---|---|---|
| KR | 10-2014-0016071 A | 2/2014 |
| KR | 10-2016-0057573 A | 5/2016 |
| WO | WO 2013/063176 A1 | 5/2013 |

* cited by examiner

TOUCH SENSOR, WINDOW STACK STRUCTURE INCLUDING THE SAME AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2020/001124, filed Jan. 22, 2020 which claims priority to the benefit of Korean Patent Application No. 10-2019-0010552 filed in the Korean Intellectual Property Office on Jan. 28, 2019, the entire contents of which are incorporated herein by reference.

BACKGROUND

1. Field

The present invention relates to a touch sensor, a window stack structure and an image display device including the same. More particularly, the present invention relates to a touch sensor including sensing electrodes and traces, a window stack structure and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is combined with the display device so that display and information input functions may be implemented in one electronic device.

The touch sensor may include sensing electrodes for converting a user's touch input an electrical signal through a change in capacitance, and traces for transmitting the electrical signal to an integrated circuit.

Recently, as an area of an image display device increases, a uniform high-resolution touch sensing implemented throughout a whole display area is being required. Accordingly, the number of sensing electrodes included in the touch sensor is increasing. However, as a bezel area excluding the display area is relatively reduced, a space in which the traces can be accommodated is also decreasing.

For example, as disclosed in Korean Patent Application Publication No. 2014-0092366, various image display devices combined with a touch screen panel including a touch sensor has been developed recently. However, efficient arrangements of sensing electrodes and traces proper for a large-scaled image display device are not suggested.

SUMMARY

According to an aspect of the present invention, there is provided a touch sensor having improved sensitivity and spatial efficiency.

According to an aspect of the present invention, there is provided a display device including a touch sensor with improved sensitivity and spatial efficiency.

According to an aspect of the present invention, there is provided a window stack structure including a touch sensor with improved sensitivity and spatial efficiency.

The above aspects of the present invention will be achieved by one or more of the following features or constructions:

(1) A touch sensor, including: a substrate layer having an active region and a peripheral region; a plurality of sensing channel columns and a plurality of sensing channel rows disposed on the active region of the substrate layer and extending in directions crossing each other; channel column traces branching from the sensing channel columns and extending on the peripheral region; channel row traces branching from the sensing channel rows and extending on the peripheral region; and a trace connector coupling the channel column traces branching from the same sensing channel columns.

(2) The touch sensor of the above (1), wherein the channel column traces include first channel column traces branching and extending from one end portions of each of the sensing channel columns, and second channel column traces branching and extending from the other end portions of each of the sensing channel columns.

(3) The touch sensor of the above (2), wherein the trace connector couples the first channel column trace and the second channel column trace branching from the same sensing channel column to each other.

(4) The touch sensor of the above (3), wherein the trace connector is integrally connected with the first channel column trace and the second channel column trace.

(5) The touch sensor of the above (3), wherein the sensing channel column includes first sensing electrodes arranged in a column direction, and a sensing electrode connector integrally connecting the first sensing electrodes to each other.

(6) The touch sensor of the above (5), wherein the trace connector and the sensing electrode connector are located at the same layer.

(7) The touch sensor of the above (3), wherein the channel row traces have a shape cut in a region intersecting the trace connector.

(8) The touch sensor of the above (7), further including first trace bridges electrically connecting cut portions of the channel row traces to each other.

(9) The touch sensor of the above (8), wherein the second channel column trace have a shape cut in a region intersecting the trace connector connected to the adjacent sensing channel column.

(10) The touch sensor of the above (9), further including second trace bridges electrically connecting cut portions of the second channel column trace to each other.

(11) The touch sensor of the above (10), wherein the sensing channel row includes second sensing electrodes arranged in a row direction and bridge electrodes electrically connecting the adjacent second sensing electrodes.

(12) The touch sensor of the above (11), wherein the bridge electrodes, the first trace bridges and the second trace bridges are located at the same layer, and include the same conductive material.

(13) The touch sensor of the above (10), wherein an increase and a decrease of length of the first trace bridges and the second trace bridges are alternately repeated along a column direction.

(14) The touch sensor of the above (8), further including a guard line extending between the channel row trace and the channel column trace neighboring each other.

(15) The touch sensor of the above (14), wherein the guard line has a shape cut in a region intersecting the trace connector.

(16) The touch sensor of the above (15), further including a guard bridge electrically connecting cut portions of the guard line to each other.

(17) The touch sensor of the above (2), the channel row traces include first channel row traces branching and extending from one end portions of each of the sensing channel rows, and second channel row traces branching and extending from the other end portions of each of the sensing channel rows.

(18) A window stack structure, including: a window substrate; and the touch sensor according to embodiments as described above stacked on the window substrate.

(19) The window stack structure of the above (18), further including a polarizing layer disposed between the window substrate and the touch sensor or disposed on the touch sensor.

(20) An image display device, including: a display panel; and the touch sensor according to embodiments as described above stacked on the display panel.

In a touch sensor according to embodiments of the present invention, channel column traces branching from the same sensing channel column may be merged by a trace connector. Accordingly, the number of traces in a trace assemble region may be decreased, so that the traces may be efficiently accommodated even when the bezel region becomes small.

Further, the number of pads in a bonding region may be decreased according to the reduced number of traces, and high-resolution touch sensing may be implemented while sufficiently achieving a connection margin in the bonding region.

The touch sensor may be applied to an image display device including a large-scaled display area to provide improved uniformity in sensitivity and spatial efficiency.

DETAILED DESCRIPTION OF THE EMBODIMENTS

According to exemplary embodiments of the present invention, there is provided a touch sensor utilizing a trace connector and a trace bridge to provide improved spatial efficiency and sensing uniformity. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
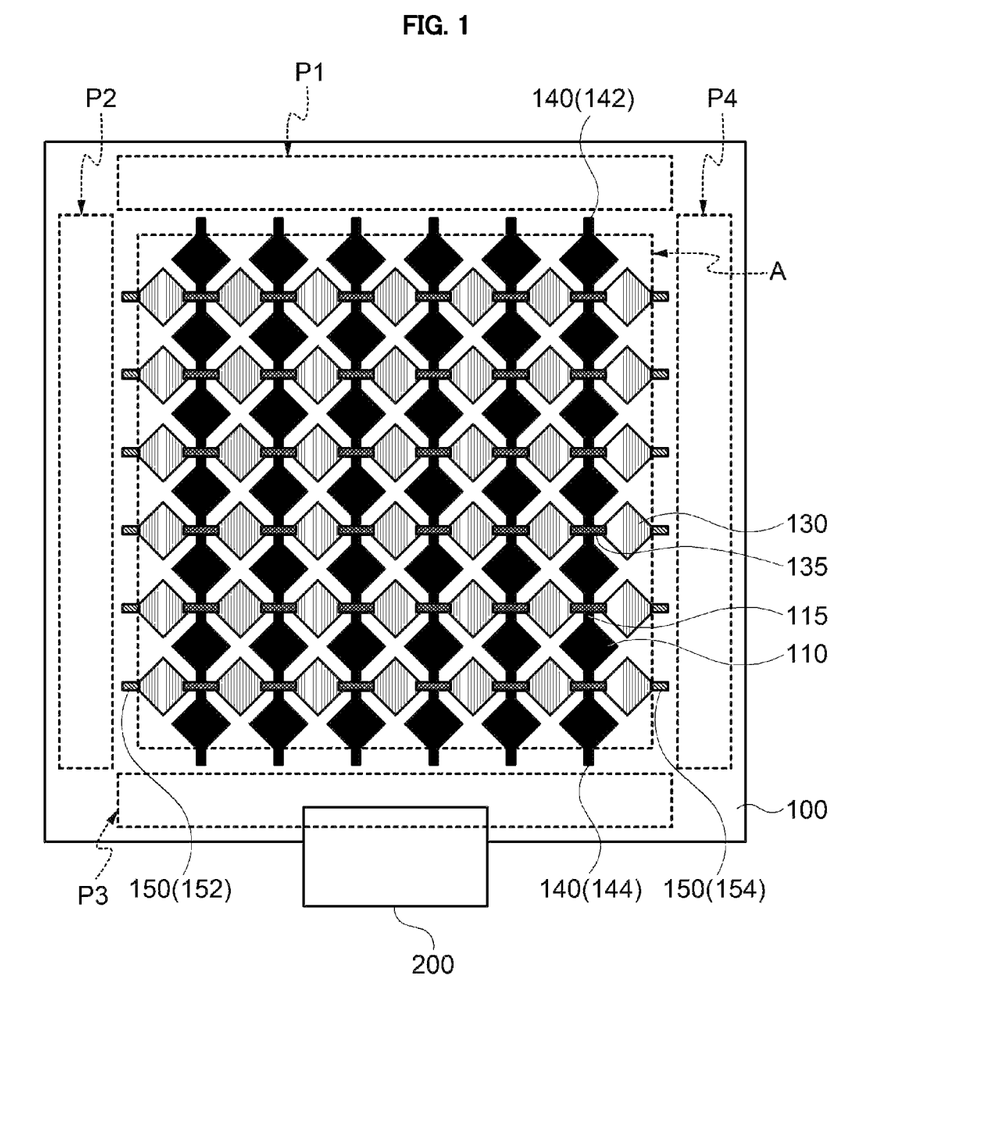
FIG. 1 is a schematic top planar view illustrating an arrangement of sensing electrodes of a touch sensor in accordance with exemplary embodiments.
Figure 2:
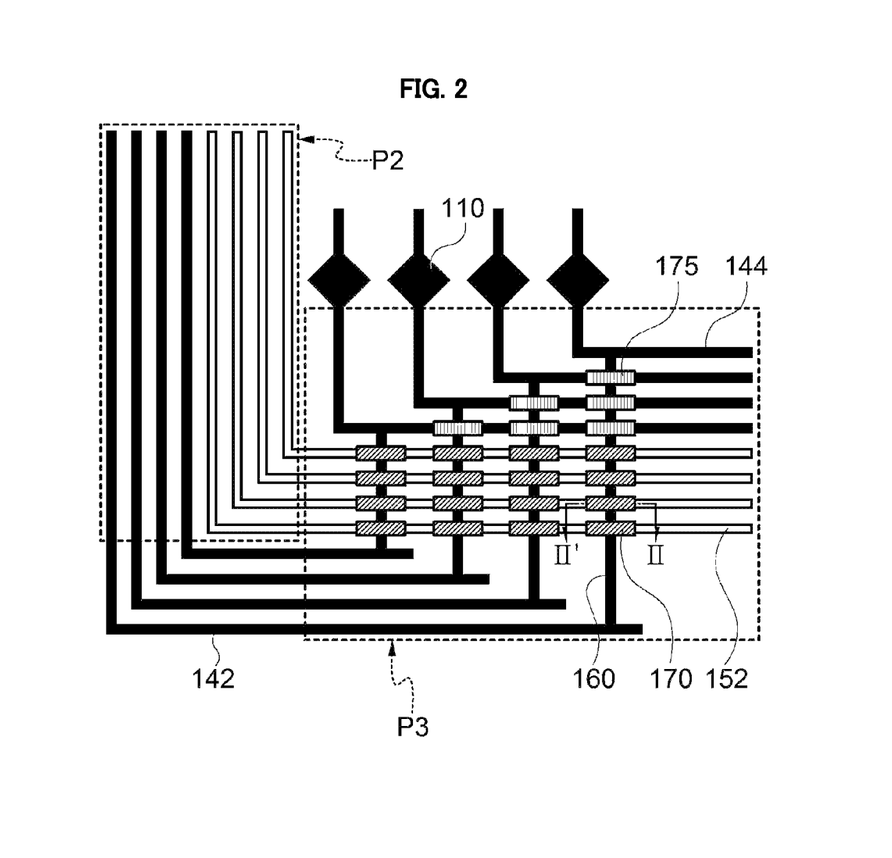
FIG. 2 is a schematic top planar view illustrating an arrangement of traces of a touch sensor in accordance with exemplary embodiments.

FIG. 1 is a schematic top planar view illustrating an arrangement of sensing electrodes of a touch sensor in accordance with exemplary embodiments. FIG. 2 is a schematic top planar view illustrating an arrangement of traces of a touch sensor in accordance with exemplary embodiments.

Figure 3:
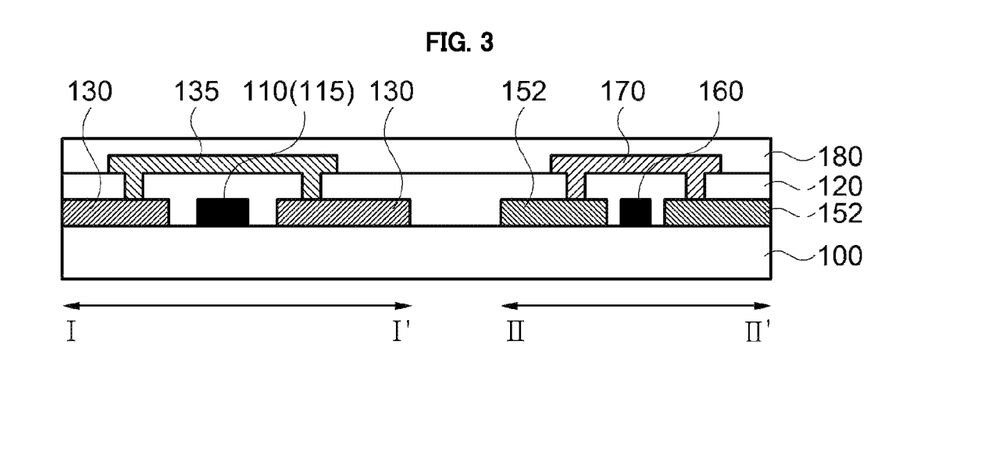
FIG. 3 is a schematic cross-sectional view illustrating structures of a sensing electrode and a trace of a touch sensor in accordance with exemplary embodiments.

FIG. 3 is a schematic cross-sectional view illustrating structures of a sensing electrode and a trace of a touch sensor in accordance with exemplary embodiments. Cross-sectional views taken along a line I-I' of FIG. 1 and a line II-IF of FIG. 2 are included together in FIG. 3.

For convenience of descriptions, arrangement of sensing electrodes in an active region A is illustrated in FIG. 1, and detailed illustrations of traces in peripheral regions P1 to P4 are omitted.

Referring to FIG. 1, the touch sensor may include a substrate layer 100 and sensing electrodes arranged on the substrate layer 100.

The substrate layer 100 is used to include a support layer, an insulating interlayer, a film-type substrate, etc., for forming the sensing electrodes 110 and 130. For example, the substrate layer 100 may include a film material commonly used for a touch sensor without particular limitation, and may include, e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride and a metal oxide.

In some embodiments, a layer or a film member of an image display device to which the touch sensor is inserted may serve as the substrate layer 100. For example, an encapsulation layer or a passivation layer included in a display panel may serve as the substrate layer 100.

The touch sensor may include the active region A and the peripheral regions P1 to P4. Accordingly, the substrate layer 100 may also include the active region A and the peripheral regions P1 to P4.

The sensing electrodes 110 and 130 may be disposed on a top surface of a portion of the substrate layer 100 in the active region A. When a user's touch is input onto the active region A, a change in capacitance may occur by the sensing electrodes 110 and 130. Accordingly, a physical touch may be converted into an electrical signal to perform a predetermined sensing function.

The sensing electrodes 110 and 130 may include first sensing electrodes 110 and second sensing electrodes 130. The first sensing electrodes 110 and the second sensing electrodes 130 may be arranged in directions crossing each other. The first sensing electrodes 110 and the second sensing electrodes 130 may be positioned at the same layer on a top surface of the substrate layer 100.

For example, the first sensing electrodes 110 may be arranged along a column direction (e.g., a Y direction). The first sensing electrodes 110 may be connected along the column direction by a sensing electrode connector 115. The sensing electrode connector 115 may be integrally connected to the first sensing electrodes 110 and may serve as a substantially single member.

A plurality of the first sensing electrodes 110 may be connected by the sensing electrode connector 115, such that a sensing channel column extending in the column direction may be defined. A plurality of the sensing channel columns may be arranged in a row direction (e.g., an X direction).

The second sensing electrodes 130 may be arranged along the row direction. Each of the second sensing electrodes 130 may have an isolated island pattern shape. The second sensing electrodes 130 neighboring in the row direction may be electrically connected to each other by a bridge electrode 135.

For example, a pair of the second sensing electrodes 130 with the sensing electrode connector 115 included in the sensing channel column interposed therebetween may be electrically connected to each other by the bridge electrode 135. Accordingly, a sensing channel row may be defined by a plurality of the second sensing electrodes 130 and the bridge electrodes 135 connected in the row direction. A plurality of the sensing channel rows may be arranged along the column direction.

As illustrated in FIG. 3, an insulating layer 120 covering the first and second sensing electrodes 110 and 130 may be formed, and the bridge electrode 135 may penetrate through the insulating layer 120 to connect the neighboring second sensing electrodes 130.

The first and second sensing electrodes 110 and 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one of the metals (e.g., silver-palladium-copper (APC) or copper-calcium (CuCa)). These may be used alone or in combination of two or more. For example, the first and second sensing electrodes 110 and 130 may have a mesh structure including the metal or alloy.

The first and second sensing electrodes 110 and 130 may include a transparent conductive oxide such as indium tin oxide (ITO), indium zinc oxide (IZO), zinc oxide (ZnO), indium zinc tin oxide (IZTO), cadmium tin oxide (CTO), etc., silver nanowire (AgNW), carbon nanotube (CNT), graphene, a conductive polymer, or the like.

The first and second sensing electrodes 110 and 130 may include a stacked structure of a transparent conductive oxide and a metal. For example, the first and second sensing electrodes 110 and 130 may have a double layered structure of a transparent conductive oxide layer-metal layer or a triple-layered structure of a transparent conductive oxide layer-metal layer-transparent conductive oxide layer. In this case, a flexible property may be improved by the metal layer and a signal transmission speed may also be improved by a low resistance of the metal layer while a corrosion resistance and a transparency may be improved by the transparent conductive oxide layer.

In FIG. 1, each of the sensing electrodes 110 and 130 is illustrated as having a rhombus pattern shape, but the shape of the sensing electrodes 110 and 130 may be properly modified n consideration of a pattern density and a matching with optical properties of an image display device. For example, the sensing electrodes 110 and 130 may be formed to have a wavy boundary.

FIG. 1 illustrates that the column direction sensing electrodes are integrally connected by the sensing electrode connector and the row direction sensing electrodes are connected by the bridge electrode, but the column direction and the row direction are relatively used to refer to two other intersecting directions and are not limited to a specific direction.

Additionally, the number of sensing channel rows and sensing channel columns, and the number of sensing electrodes included therein are only partially illustrated in FIG. 1 for convenience of descriptions, and may be increased according to an area of the active region A.

The peripheral region may be defined as a region around a periphery of the active region A. For example, a region surrounding the periphery of the active region A may be defined as the peripheral region.

As illustrated in FIG. 1, the peripheral region may include first to fourth peripheral regions P1 to P4.

The first peripheral region P1 and the third peripheral region P3 may include two end regions in the column direction. The second peripheral region P2 and the third peripheral region P4 may include two lateral regions in the row direction.

A channel column trace 140 may branch and extend from each of the sensing channel columns including the first sensing electrodes 110. In exemplary embodiments, traces may branch and extend from both terminal ends of each sensing channel column.

As illustrated in FIG. 1, a first channel column trace 142 may branch from one end portion of the sensing channel column (an upper end in FIG. 1) to the first peripheral region P1, and a second channel column trace 144 may branch from the other end portion of the sensing channel column (a lower end in FIG. 1) to the third peripheral region P3.

A channel row trace 150 may branch and extend from each of the sensing channel rows including the second sensing electrodes 130. In exemplary embodiments, traces may branch and extend from both terminal ends of each sensing channel row.

As illustrated in FIG. 1, a first channel row trace 152 may branch from one end portion (a left end in FIG. 1) of the sensing channel row to the second peripheral region P2, and a second channel row trace 154 may branch from the other end portion of the sensing channel row (a right end in FIG. 1) to the fourth peripheral region P4.

As described above, two traces may be connected to each sensing channel row and each sensing channel column. Accordingly, a signal path from the sensing channel row or sensing channel column may be shortened.

For example, when the touch sensor is applied to a large-area image display device, sensing sensitivity deviation may occur according to a distance from a touch point. However, the traces may be disposed at both ends of the sensing channel, so that a difference in channel resistance according to the touch point may be reduced, thereby improving uniformity of sensing sensitivity.

In some embodiments, the third peripheral region P3 may provide a bonding region in which the trances are collected to be connected to an external connection circuit.

For example, the first channel column traces 142 may be bent to be distributed from the first peripheral region P1 to the second peripheral region P2 or the fourth peripheral region P4. Thereafter, the first channel column traces 142 may be bent again to extend from the second peripheral region P2 and the fourth peripheral region P4 to the third peripheral region P3. The second channel column traces 144 may directly enter the third peripheral region P30.

The first channel row traces 152 may extend in the column direction in the second peripheral area P2 and may be bent in the row direction to extend to the third peripheral area P3. The second channel row traces 154 may extend in the column direction in the fourth peripheral area P4 and may be bent in the row direction to extend to the third peripheral area P3.

Accordingly, the first and second channel column traces 142 and 140 and the first and second channel row traces 152 and 154 may be collected in the third peripheral region P3. Terminal end portions of the traces may be provided as terminal portions or pad portions to be electrically connected to a flexible printed circuit board 200. For example, a conductive intermediate layer such as an anisotropic conductive film (ACF) may be formed on the terminal end portions, and then the flexible printed circuit board 200 may be bonded to the conductive intermediate layer by a pressing process.

The flexible printed circuit board 200 may be connected to the external driving circuit such as, e.g., a driving IC chip. Accordingly, signal transmission to the external driving circuit may be performed through the traces 140 and 150.

Referring to FIG. 2, as described above, in the second peripheral region P2, the first channel column traces 142 and the first channel row traces 152 may extend together in the column direction. In the third peripheral region P3, the first channel column traces 142 and the first channel row traces 152 are bent in the row direction, and may be distributed together with the second channel column traces 144.

In exemplary embodiments, the channel column traces 142 and 144 connected to the same sensing channel column may be connected or coupled to each other by a trace connector 160.

The first channel column trace 142 entering the third peripheral region P3 may be coupled with the corresponding second channel column trace 144 by the trace connector 160, so that the channel column trace 140 may be connected to the flexible circuit board 200 and the external driving circuit via the second channel column trace 144. Accordingly, an additional extension of the first channel column traces 142 may be omitted, and an area of the third peripheral region P3 may be further reduced while reducing a wiring density in the third peripheral region P3.

The trace connector 160 may extend in the column direction, and the first channel row traces 152 may have a cut shape by the trace connector 160 in the third peripheral area P3. In exemplary embodiments, the cut first channel row traces 152 may be electrically connected to each other by a first trace bridge 170.

As illustrated in FIG. 2, the first trace bridge 170 may disposed to correspond to a cut region of each first channel row trace 152 to electrically connect cut portions of each of the first channel row traces 152 to each other.

One first channel row trace 152 may include cut regions corresponding to the number of intersecting trace connectors 160, and the first trace bridges 170 may be disposed to correspond to the number of the cut regions.

As illustrated in FIG. 3, the first trace bridge 170 may be disposed on the insulating layer 120, and may be formed through the insulating layer 120 to connect portions of the first channel row traces 152 spaced apart from each other with the trace connector 160 interposed therebetween along the row direction.

The trace connector 160 may be located at the same layer or at the same level as that of the sensing electrode connector 115 (or the first sensing electrode 110) in the active region A.

In some embodiments, the trace connector 160 and the sensing electrode connector 115 (or the first sensing electrode 110) may include different conductive materials. For example, the first sensing electrode 110 and the sensing electrode connector 115 may include a transparent conductive oxide such as ITO to improve transmittance in the active region A. The trace connector 160 may include a metal to reduce a signal transmission resistance. In this case, the trace connector 160 may be formed by patterning the same metal layer as that of the first and second channel column traces 142 and 144.

In some embodiments, the trace connector 160 may include a conductive layer formed from the same transparent conductive oxide layer as that of the first sensing electrode 110 and the sensing electrode connector 115. The trace connector 160 may further include a metal layer formed on the conductive layer.

For example, the traces 140 and 150 and the trace connector 160 may include silver (Ag), gold (Au), copper (Cu), aluminum (Al), platinum (Pt), palladium (Pd), chromium, (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one of the metals (e.g., silver-palladium-copper (APC) or copper-calcium (CuCa)). These may be used alone or in combination of two or more therefrom.

Referring again to FIG. 2, a plurality of the trace connectors 160 may be repeatedly arranged to correspond to each sensing channel column. The plurality of the trace connectors 160 may be sequentially connected to different adjacent sensing channel columns. For example, a length of the trace connector 160 may change along the row direction (e.g., the length may increase sequentially).

The second channel column trace 144 may have a cut shape by the trace connector 160 connected to the different adjacent sensing channel column. Cut portions of the second channel column trace 144 may be electrically connected to each other by a second trace bridge 175.

The second trace bridge 175 may have a shape substantially the same as or similar to that of the first trace bridge 170, and may be formed from the same conductive layer through the same patterning process.

The arrangement and connection of the traces in the second peripheral region P2 and the third peripheral region P3 have been described with reference to FIG. 2. Further, the arrangement and connection of the traces may be implemented by the same manner as described above in the fourth peripheral region P4 and the third peripheral region P3.

For example, the second channel row traces 154 extending from the fourth peripheral region P4 may be bent to extend to the third peripheral region P3. In the third peripheral region P3, the second channel row traces 154 have a shape cut by the trace connector 160, and cut portions of the second channel row traces 154 may be electrically connected to each other by the first trace bridges 170.

The trace bridges 170 and 175 and the bridge electrode 135 may each include the above-described metal or alloy. The trace bridges 170 and 175 and the bridge electrode 135 may include a transparent conductive material such as the transparent conductive oxide as described above.

The trace bridges 170 and 175 and the bridge electrode 135 may be located at the same layer or at the same level, and may include the same conductive material.

As illustrated in FIG. 3, a passivation layer 180 may be formed on the insulating layer 120 to cover the bridge electrode 135 and the trace bridges 170 and 175. The insulating layer 120 and the passivation layer 180 may include an inorganic insulating material such as silicon oxide or silicon nitride, or an organic insulating material such as an acrylic resin or a siloxane-based resin.

Figure 4:
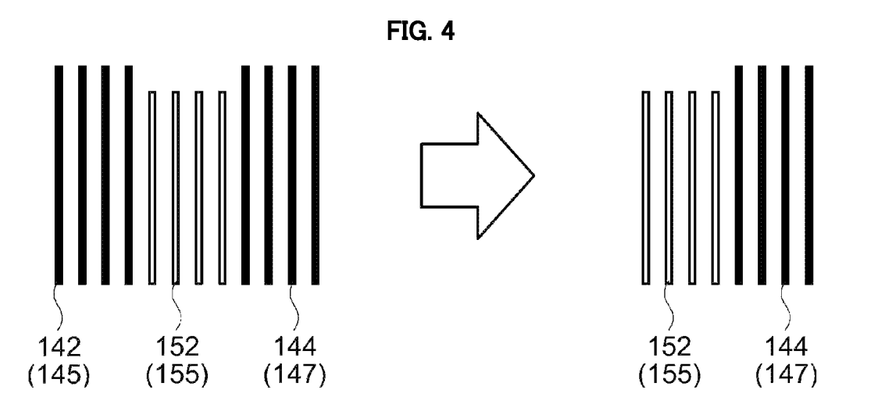
FIG. 4 is a schematic view for explaining a reduction of the number of pads in accordance with exemplary embodiments.

FIG. 4 is a schematic view for explaining a reduction of the number of pads in accordance with exemplary embodiments.

Referring to FIG. 4, the traces may be bent again in, e.g., the column direction, and the connection to the flexible printed circuit board 200 may be implemented in the bonding region through the terminal end portions of the traces.

As illustrated in a left portion of FIG. 4, according to a comparative example, both the first channel column traces 142 and the second channel column traces 144 are individually collected in the bonding region. Accordingly, a first channel column terminal portion 145 from the first channel column trace 142, a first channel row terminal portion 155 from the first channel row trace 152 and a second channel column terminal portion 147 from the second channel column trace 144 are all disposed in the bonding region.

According to an exemplary embodiment illustrated in a right portion of FIG. 4, as described with reference to FIG. 2, the first channel column trace 142 may be coupled to the corresponding second channel column trace 144 by the trace connector 160. Accordingly, the first channel column trace 142 may be omitted in the bonding region, and signal transmission and electrical connection with the sensing channel column may be implemented only using the second channel column terminal portion 147.

Thus, a wiring connection margin may be achieved in the bonding region, and electrical connection failure and parasitic capacitance between the adjacent traces may be reduced.

Figure 5:
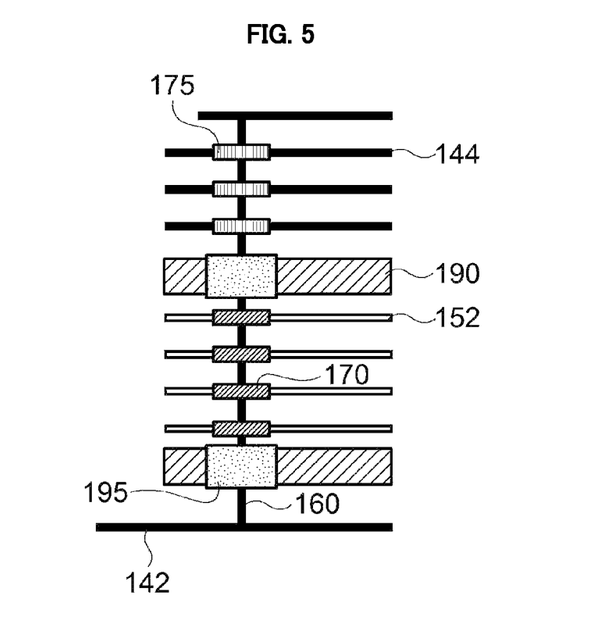
FIG. 5 is a schematic top planar view illustrating an arrangement of traces of a touch sensor in accordance with some exemplary embodiments.

FIG. 5 is a schematic top planar view illustrating an arrangement of traces of a touch sensor in accordance with some exemplary embodiments.

Referring to FIG. 5, a guard line 190 may be disposed between some neighboring traces. For example, the guard line 190 may extend in the row direction together with the traces in the third peripheral region P3.

In some embodiments, the guard line 190 may be disposed between neighboring channel column trace and channel row trace. For example, as illustrated in FIG. 5, the guard line 190 may be disposed between the first channel column trace 142 and the first channel row trace 152 adjacent to each other in the column direction, and between the second channel column trace 144 and the first channel row traces 152 adjacent to each other in the column direction.

The guard line 190 may be added, so that noise and interference between the channel row trace and the channel column trace may be shielded to improve sensing resolution and reliability.

The guard line 190 may include a cut region cut by the trace connector 160 extending in the column direction. A guard bridge 195 may be disposed on the cut region to electrically connect cut portions of the guard line 190 to each other.

The guard bridge 195 may be formed from the same conductive layer as that of the trace bridges 170 and 175 through the same patterning process.

Figure 6:
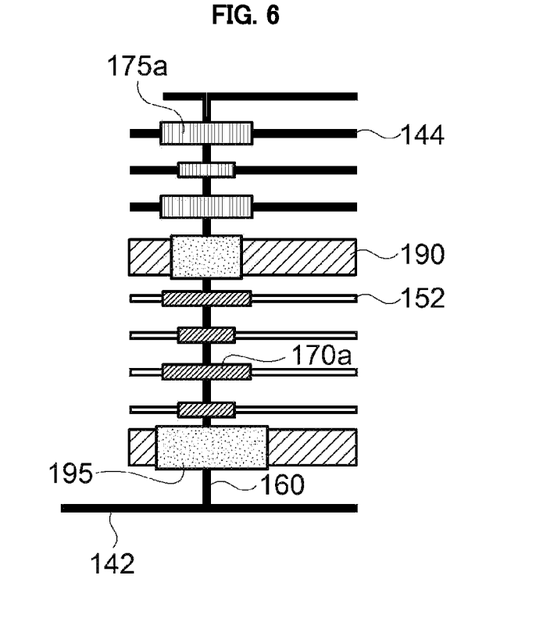
FIG. 6 is a schematic top planar view illustrating an arrangement of traces of a touch sensor in accordance with some exemplary embodiments

FIG. 6 is a schematic top planar view illustrating an arrangement of traces of a touch sensor in accordance with some exemplary embodiments Referring to FIG. 6, trace bridges 170a and 175a may be formed so that increase and decrease of lengths may be repeated in the column direction. For example, in the first trace bridges 170a, a bridge having a short length and a bridge having a large length may be alternately disposed along the column direction. In the second trace bridges 175a, short bridges and long bridges may be alternately disposed along the column direction.

The trace bridges 170a and 175a may be formed in a zigzag shape in a planar view, so that an etch margin may be increased when forming a contact hole for forming the trace bridges 170a and 175a in the insulating layer 120. Accordingly, a short circuit between the adjacent trace bridges 170a and 175a may be prevented and an independent signal transmission may be ensured.

Figure 7:
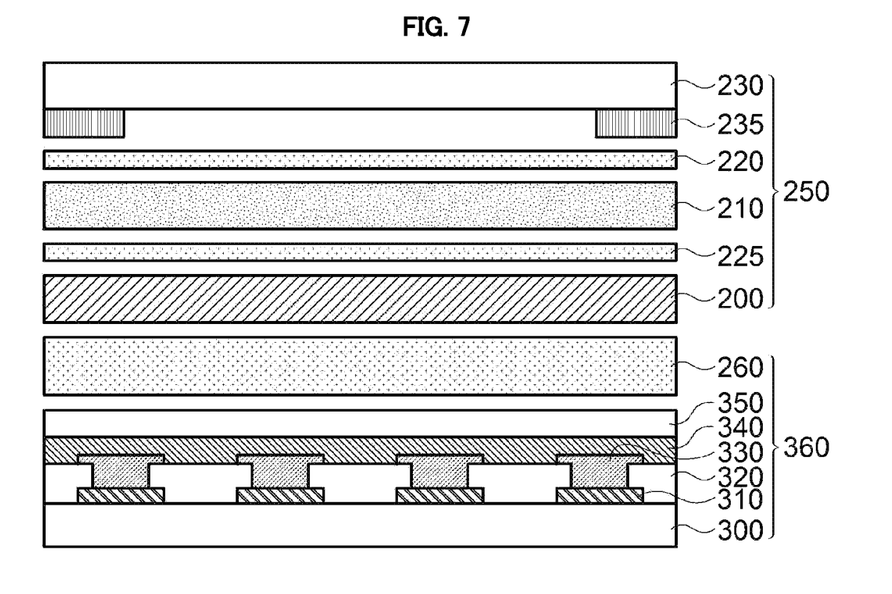
FIG. 7 is a schematic view illustrating a window stack structure and an image display device in accordance with exemplary embodiments.

FIG. 7 is a schematic view illustrating a window stack structure and an image display device in accordance with exemplary embodiments.

Referring to FIG. 7, a window stack structure 250 may include a window substrate 230, a polarizing layer 210 and a touch sensor 200 according to the above-described exemplary embodiments.

The window substrate 230 may include, e.g., a hard coating film or glass (e.g., ultra-thin glass (UTG)). In an embodiment, a light-shielding pattern 235 may be formed on a peripheral portion of one surface of the window substrate 230. The light-shielding pattern 235 may include, e.g., a color-printed pattern, and may have a single-layered or multi-layered structure. A bezel portion or a non-display area of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may include the traces and the sensing electrodes having the construction according to exemplary embodiments as described above, and may be included in the window stack structure 250 as a form of a film or a panel. In an embodiment, the touch sensor 200 may be combined with the polarizing layer 210 via a second adhesive layer 225.

As illustrated in FIG. 7, the window substrate 230, the polarizing layer 210 and the touch sensor 200 may be sequentially positioned from a viewer's side. In this case, the electrode layer of the touch sensor 200 may be disposed under the polarizing layer 210 so that electrodes may be effectively prevented from being seen by the viewer.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

An image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and an insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

As described above, some traces included in the touch sensor 200 may be coupled so that a bezel area may be reduced. Accordingly, the area of the active region or the display area may be relatively increased, and a large-area image display device having improved uniformity of touch sensitivity may be provided.

What is claimed is:

1. A touch sensor, comprising:
    a substrate layer having an active region and a peripheral region;
    a plurality of sensing channel columns and a plurality of sensing channel rows disposed on the active region of the substrate layer and extending in directions crossing each other;
    channel column traces branching from the sensing channel columns and extending on the peripheral region;
    channel row traces branching from the sensing channel rows and extending on the peripheral region; and
    a trace connector coupling the channel column traces branching from the same sensing channel columns,
    wherein the trace connector, the channel row traces and the channel column traces are located at the same layer; and
    the trace connector is integrally connected with the channel column traces to cut across the channel row traces.

2. The touch sensor of claim 1, wherein the channel column traces comprise first channel column traces branching and extending from one end portions of each of the sensing channel columns, and second channel column traces branching and extending from the other end portions of each of the sensing channel columns.

3. The touch sensor of claim 2, wherein the trace connector couples the first channel column trace and the second channel column trace branching from the same sensing channel column to each other.

4. The touch sensor of claim 3, wherein the sensing channel column comprises first sensing electrodes arranged in a column direction, and a sensing electrode connector integrally connecting the first sensing electrodes to each other.

5. The touch sensor of claim 4, wherein the trace connector and the sensing electrode connector are located at the same layer.

6. The touch sensor of claim 2, the channel row traces comprise first channel row traces branching and extending from one end portions of each of the sensing channel rows, and second channel row traces branching and extending from the other end portions of each of the sensing channel rows.

7. The touch sensor of claim 1, further comprising first trace bridges electrically connecting cut portions of the channel row traces to each other.

8. The touch sensor of claim 7, wherein the second channel column trace have a shape cut in a region intersecting the trace connector connected to the adjacent sensing channel column.

9. The touch sensor of claim 8, further comprising second trace bridges electrically connecting cut portions of the second channel column trace to each other.

10. The touch sensor of claim 9, wherein the sensing channel row comprises second sensing electrodes arranged in a row direction and bridge electrodes electrically connecting the adjacent second sensing electrodes.

11. The touch sensor of claim 10, wherein the bridge electrodes, the first trace bridges and the second trace bridges are located at the same layer, and comprise the same conductive material.

12. The touch sensor of claim 9, wherein an increase and a decrease of length of the first trace bridges and the second trace bridges are alternately repeated along a column direction.

13. The touch sensor of claim 7, further comprising a guard line extending between the channel row trace and the channel column trace neighboring each other.

14. The touch sensor of claim 13, wherein the guard line has a shape cut in a region intersecting the trace connector.

15. The touch sensor of claim 14, further comprising a guard bridge electrically connecting cut portions of the guard line to each other.

16. A window stack structure, comprising:
    a window substrate; and
    the touch sensor of claim 1 stacked on the window substrate.

17. The window stack structure of claim 16, further comprising a polarizing layer disposed between the window substrate and the touch sensor or disposed on the touch sensor.

18. An image display device, comprising:
    a display panel; and
    the touch sensor of claim 1 stacked on the display panel.

* * * * *